Sept. 12, 1967    L. G. SIMJIAN    3,340,790
DISPENSING APPARATUS
Filed Nov. 22, 1965    2 Sheets-Sheet 1

Luther G. Simjian
INVENTOR.

BY Erwin B. Steinberg
AGENT.

Sept. 12, 1967    L. G. SIMJIAN    3,340,790
DISPENSING APPARATUS

Filed Nov. 22, 1965    2 Sheets-Sheet 2

Luther G. Simjian
INVENTOR.

BY Erwin B. Steinberg
AGENT.

United States Patent Office 3,340,790
Patented Sept. 12, 1967

3,340,790
DISPENSING APPARATUS
Luther G. Simjian, Greenwich, Conn., assignor to General Research, Inc., Greenwich, Conn., a corporation of Connecticut
Filed Nov. 22, 1965, Ser. No. 508,898
3 Claims. (Cl. 99—352)

ABSTRACT OF THE DISCLOSURE

An apparatus for storing, conditioning and dispensing food or a similar substance contained in a flexible casing. The apparatus includes a refrigerated housing for storing said casings, for dispensing a casing, transport means for transporting a dispensed casing through a conditioning station and to a substance removing station at which the conditioned substance confined in the casing is released therefrom.

---

This invention is related to my copending application for U.S. Letters Patent, Ser. No. 462,612, entitled, "Dispensing Machine," filed on June 9, 1965. It refers, more particularly, to an arrangement and apparatus for dispensing a substance which is confined in a flexible casing. Quite specifically, this invention pertains to an apparatus for dispensing a substance, particularly food, which requires protection and preservation during storage, requires conditioning prior to consumption and wherein such conditioning is accomplished in the apparatus immediately preceding the dispensing of such substance.

While the above recitation broadly identifies the general field of the invention, the instant apparatus, when used with food in the specific manner described hereafter, is suited particularly for dispensing meals which may include such items as heated soup, mashed potatoes, cut vegetables, hash type meats and other fluent substances. To this end, the apparatus is provided with means for receiving and storing a plurality of individual casings, each casing confining therein an edible substance, means for releasing a casing from the storage means, means for advancing a released casing from a storage station to a conditioning station for conditioning the substance while the latter is still confined in the casing and, finally, moving the same casing to a substance removing station where the substance is released from the casing and dispensed into a suitable receptacle.

One of the principal objects of this invention, therefore, is the provision of a dispensing apparatus adapted to receive food which is packaged in a specific manner, to condition the food for consumption and then to dispense the conditioned food.

Another object of this invention is the provision of an apparatus for dispensing substances which are confined in individual, flexible casings, wherein such substances are conditioned while confined in such casings, and wherein subsequently such casings are opened and the substances released therefrom.

Still another object of this invention is the provision of an apparatus for prepackaging and retaining food substances in individual, flexible, sealed casings, maintaining such casings under suitable storage conditions and for subsequently conditioning the respective substance prior to its release from the associated casing.

Further and still other objects of this invention will be more clearly apparent by reference to the following description when taken in conjunction with the accompanying drawings, in which.

Figure 1:
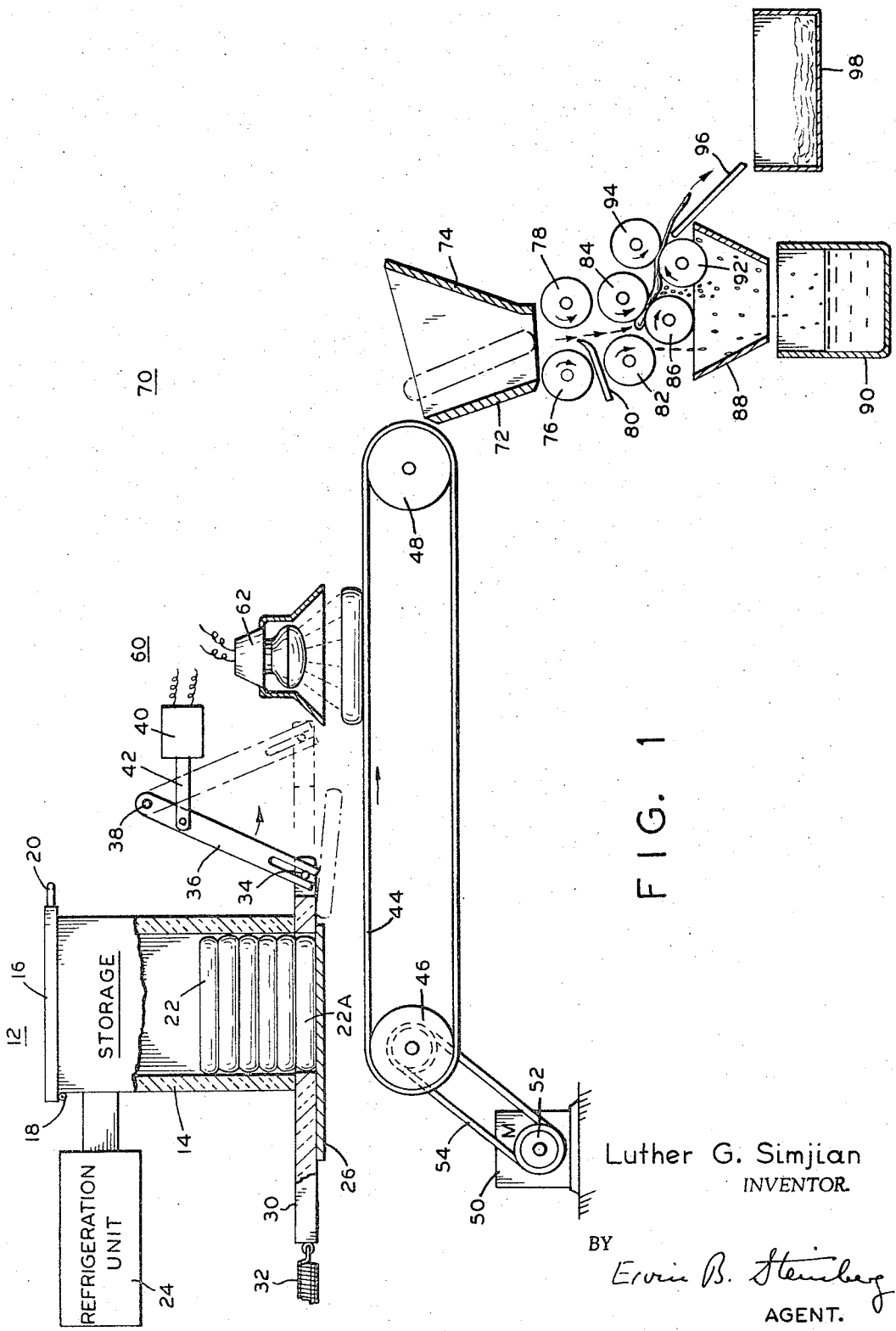
FIGURE 1 is a schematic diagram of a typical and preferred embodiment of my invention.

Referring now to the figures and FIGURE 1 in particular, numeral 12 refers generally to a storage station which includes an upright storage receptacle 14 having a lid 16 which is attached to the receptacle 14 by means of a hinge 18. A handle 20 serves to conveniently open the lid for filling the receptacle with a plurality of individual casings 22. In the preferred embodiment, each casing is a flexible, sealed plastic enclosure which confines therein a fluent substance of food. Polyethylene sheeting, for instance, provides a suitable casing. The food may be partially prepared in a manner which is similar to frozen food. In order to preserve the substance during storage, there is disposed a refrigeration unit 24 which conveys cooled air to the receptacle 14. The storage receptacle is supported on a support plate 26. In order to dispense a casing from the receptacle, there is provided an apertured slide 30 adapted to receive in its aperture a single casing, such as the lowermost casing 22A. The slide normally is maintained in the position shown by the solid lines in FIGURE 1 by a helical spring 32. The slide is coupled by means of a pin 34 to a bifurcated lever 36 which is pivotally mounted at a pin 38. The lever 36 is adapted to be operated by a solenoid 40 whose plunger 42 is secured to the lever 36.

When actuating the slide 30, by energizing the solenoid 40 with electrical energy, a single casing, such as the casing 22A, is released from the storage receptacle 14, as shown by the dashed lines, and dropped upon the underlying transport means 44. This transport means is an endless belt which is adapted to rotate about a set of spaced rollers 46 and 48. Roller 46 is driven by an electric motor 50 via a pulley 52 and a drive belt 54.

The transport means, belt 44, transports the released casing to a conditioning station which is identified generally by numeral 60. The conditioning station conditions the heretofore preserved substance for consumption while such substance is still confined in the casing. Typically, the conditioning station includes a heating means, such as one or more infrared heating means 62 depicted. Alternatively, a hot water bath, steam jets, electrical or gas flash heaters, or other commercially available means may be employed.

From the conditioning station 60, the conditioned substance, still confined in the casing, is moved by the belt 44 to the substance removing station, generally identified by numeral 70.

As the belt 44 rotates, the casing falls between a set of guide plates 72 and 74 and is drawn into the space between a set of rollers 76 and 78. The motor means for actuating the rollers is not shown as this is well understood. A stationary knife 80 which is provided with a cutting edge enters the casing wall and slits the casing, causing the fluent substance confined in the casing to drop through the space between the rollers 82, 84 and 86, and through a funnel shaped baffle 88 into a receptacle 90. The, at least partially empty, casing then is drawn through a set of squeeze rollers 92 and 94 which completely empty the casing by squeezing it. Finally, the casing is guided over a guide baffle 96 into a waste receptacle 98.

Figure 3:
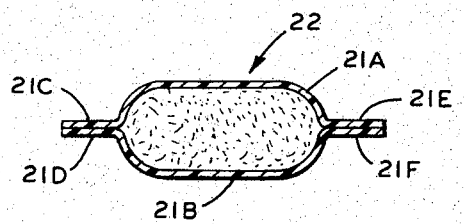
FIGURE 3 is a sectional view of an improved casing construction.

In order to guide the casing along the curved path between the rollers 76, 78, 82, 84 and 86 to the final squeeze rollers 92 and 94, it will be advantageous to use an improved casing construction as shown in FIGURE 3. The casing is constructed from two halves 21A and 21B. The halves are sealed to each other at the flanged portions 21C, 21D, 21E and 21F. Such sealing may be accomplished by heat or ultrasonic energy. These flanges are adapted to be engaged by special guides or guide rollers (not shown) for guiding the casing through the path at the substance removing station 70. The double thickness of the casing material at the flanged portion provides relative rigidity so as to enable improved handling of the casing. By virtue of the curved path provided by the rollers, the released substance and the empty casing are readily separated from each other.

Figure 2:
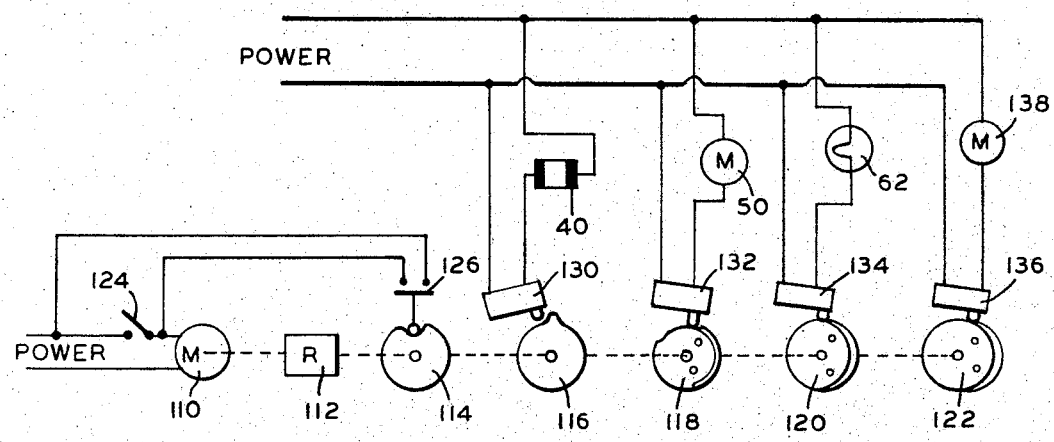
FIGURE 2 is a schematic electrical circuit diagram of the control circuit.

The control circuit is depicted in FIGURE 2. It comprises a timing motor 110 which drives via a reduction gear mechanism 112 a set of timing cams 114, 116, 118, 120 and 122. The switch 124, when closed, provides power to the motor 110 which rotates the cam 114 to close the associated switch 126. The switch 126 maintains the motor 110 running for one complete cycle although the switch 124 may be closed momentarily as is the case, for instance, in a vending apparatus where the switch 124 is actuated by a passing coin. The cam 116 via a switch 130 operates the solenoid 40, cam 118 via switch 132 the motor 50 for advancing the belt 44, cam 120 via switch 134 to heating means 62, and cam 122 via switch 136 the motor 138 which is coupled to rotate the various rollers at the substance removing station 70.

The rotation of the belt 44 may be a continuous one or a stepped one, depending upon the particular preference, the timing cycle desired, and the particular substance which needs to be conditioned.

It will be apparent that the various rollers of the substance removing station may be sanitized periodically by means of a water or vapor rinse and that an ultraviolet lamp or other means may be provided to maintain a satisfactory bacteria count.

While there has been described and illustrated a preferred embodiment of my invention and several modifications have been indicated, it will be apparent to those skilled in the art that various further changes and modifications may be made therein without departing from the broad principle and intent of this invention which shall be limited only by the scope of the appended claims.

What is claimed is:

1. A dispensing machine for use with flexible casings, each containing a substance which is to be conditioned while confined in such casing and subsequently removed therefrom by opening the casing comprising:

a storage station including a receptacle provided with refrigeration means for storing and preserving a plurality of such casings;

dispensing means associated with said receptacle for releasing, when actuated, a casing;

a transport means which includes a movable belt disposed for receiving a released casing and, responsive to control means associated therewith, transporting such casing past a conditioning station to a substance removing station;

said conditioning station including a heating means for heating the substance confined in the casing;

said substance removing station including a set of rollers for receiving therebetween a casing, and a slitting knife for engaging a casing as such casing is fed between said rollers and opening the respective casing whereby to release the conditioned substance confined in such casing;

said rollers providing a curved path for the casing for separating the empty casing from the released substance and including a set of squeeze rollers for squeezing the walls of the opened casing in order to remove any remaining substance;

a receptacle disposed adjacent said set of rollers for collecting emptied casings, and control means coupled to said dispensing means, said heating means disposed at said conditioning station, said set of rollers and to said transport means for causing correlated operation thereof.

2. A dispensing machine as set forth in claim 1 wherein said heating means comprises a heating lamp.

3. A dispensing machine as set forth in claim 1 wherein said control means includes a set of timing cams and electrical switching means for providing timed operation of said dispensing means, said heating means, said set of rollers, and said transport means.

References Cited

UNITED STATES PATENTS

| | | | |
|---|---|---|---|
| 2,501,712 | 3/1950 | Chodziesner | 99—357 |
| 2,504,110 | 4/1950 | Davis et al. | 99—386 X |
| 2,686,614 | 8/1954 | Geressy et al. | 222—102 |
| 3,014,617 | 12/1961 | Kireta | 221—268 X |
| 3,048,070 | 8/1962 | Groves | 221—25 X |
| 3,181,732 | 5/1965 | Immermann et al. | 222—80 |
| 3,181,734 | 5/1965 | Ensign. | |
| 3,224,361 | 12/1965 | Ojelid | 99—357 |
| 3,233,536 | 2/1966 | Ignelzi | 99—357 |
| 3,260,404 | 7/1966 | Critchell | 221—30 X |
| 3,276,352 | 10/1966 | Allen et al. | 99—352 |

FOREIGN PATENTS

| | | |
|---|---|---|
| 1,359,015 | 3/1964 | France. |

BILLY J. WILHITE, *Primary Examiner.*